US011559046B2

(12) United States Patent
Goldsborough et al.

(10) Patent No.: US 11,559,046 B2
(45) Date of Patent: Jan. 24, 2023

(54) CLOUD-BASED AUTONOMOUS AQUACULTURE SYSTEM

(71) Applicant: FOREVER OCEANS CORPORATION, Warrenton, VA (US)

(72) Inventors: Mathew Goldsborough, Kailua Kona, HI (US); Jason Heckathorn, Nokesville, VA (US); Joseph Chop, Kailua Kona, HI (US)

(73) Assignee: Forever Oceans Corporation, Bethesda, MD (US)

( * ) Notice: Subject to any disclaimer, the term of this patent is extended or adjusted under 35 U.S.C. 154(b) by 439 days.

(21) Appl. No.: 15/551,143

(22) PCT Filed: Feb. 18, 2016

(86) PCT No.: PCT/US2016/018445
§ 371 (c)(1),
(2) Date: Aug. 15, 2017

(87) PCT Pub. No.: WO2016/134133
PCT Pub. Date: Aug. 25, 2016

(65) Prior Publication Data
US 2018/0064071 A1    Mar. 8, 2018

Related U.S. Application Data

(60) Provisional application No. 62/118,171, filed on Feb. 19, 2015.

(51) Int. Cl.
*A01K 61/10*     (2017.01)
*A01K 61/80*     (2017.01)
(Continued)

(52) U.S. Cl.
CPC .............. *A01K 61/10* (2017.01); *A01K 29/00* (2013.01); *A01K 29/005* (2013.01); *A01K 61/60* (2017.01);
(Continued)

(58) Field of Classification Search
CPC ...... A01K 29/00; A01K 29/005; A01K 61/10; A01K 61/60; A01K 61/80; A01K 63/10;
(Continued)

(56) References Cited

U.S. PATENT DOCUMENTS 9,401,977 B1 *   7/2016   Gaw .................. H04M 1/72569
2003/0070624 A1   4/2003   Zohar et al.
(Continued)

FOREIGN PATENT DOCUMENTS

CN    102608974 A    7/2012
CN    102799164 A    11/2012
(Continued)

OTHER PUBLICATIONS

European Search Report application No. 16753049.2 dated Nov. 7, 2018.
(Continued)

*Primary Examiner* — Brady W Frazier
(74) *Attorney, Agent, or Firm* — Rimon Law, P.C.

(57) ABSTRACT

A system and method for remote monitoring and command and control of one or many offshore aquafarms is provided. Operators are able to securely access web applications and services hosted in the cloud through which husbandry functions such as feeding fish, cleaning the cage and removing mortalities can be automatically scheduled and executed. Offshore aquafarms relay information, such as environmental sensor data and video feeds back to the cloud to be viewed by the operators.

6 Claims, 4 Drawing Sheets

(51) Int. Cl.
*A01K 29/00* (2006.01)
*A01K 61/60* (2017.01)
*A01K 63/10* (2017.01)
*H04L 67/10* (2022.01)
*A01K 79/00* (2006.01)

(52) U.S. Cl.
CPC .............. *A01K 61/80* (2017.01); *A01K 63/10* (2017.01); *A01K 79/00* (2013.01); *H04L 67/10* (2013.01); *Y02A 40/81* (2018.01)

(58) Field of Classification Search
CPC .... A01K 79/00; Y02A 40/826; Y02A 40/845; H04L 67/10
USPC .......................................................... 43/4.5
See application file for complete search history.

(56) References Cited

U.S. PATENT DOCUMENTS

| | | | | |
|---|---|---|---|---|
| 2009/0067433 | A1* | 3/2009 | St. Laurent | H04L 12/54 370/395.1 |
| 2009/0235870 | A1* | 9/2009 | Troy | F03G 7/05 119/223 |
| 2011/0315085 | A1* | 12/2011 | Lindgren | A01K 61/60 119/203 |
| 2012/0006277 | A1 | 1/2012 | Troy et al. | |
| 2012/0143381 | A1 | 6/2012 | Lawyer et al. | |
| 2012/0316913 | A1 | 12/2012 | Reyes | |
| 2014/0071167 | A1 | 3/2014 | Lauenstein et al. | |
| 2014/0149494 | A1* | 5/2014 | Markley | H04L 67/34 709/203 |
| 2015/0156998 | A1* | 6/2015 | Terry | A01K 69/00 43/4.5 |
| 2015/0272018 | A1* | 10/2015 | Menard | A01G 31/02 119/223 |

FOREIGN PATENT DOCUMENTS

| | | |
|---|---|---|
| EP | 2818864 A1 | 12/2014 |
| WO | WO 2010/049957 A1 | 5/2010 |
| WO | WO-2015/034481 A1 | 3/2015 |

OTHER PUBLICATIONS

International Search Report & Written Opinion dated Apr. 22, 2016 corresponding to International Patent Application No. PCT/US2016/018445.
Feb. 18, 2016 Search Report issued in Chinese Patent Application No. 2016800109162.
Jul. 26, 2019 Office Action issued in Chilean Patent Application No. 201702124.

* cited by examiner

CLOUD-BASED AUTONOMOUS AQUACULTURE SYSTEM

CROSS-REFERENCE TO RELATED APPLICATIONS

This application claims priority from U.S. Provisional Application No. 62/118,171, filed on Feb. 19, 2015. The entire contents of this earlier filed application are hereby incorporated in their entirety.

FIELD

Certain embodiments generally relate to the use of computer systems, and more specifically, to the use of cloud computing for automated monitoring and command and control of aquaculture systems.

BACKGROUND

Managing and operating conventional open ocean aquaculture systems is fraught with very difficult and dangerous tasks. Day to day husbandry functions, such as feeding the fish, cleaning the cage or monitoring the environment, require teams to make daily trips to offshore pens containing the fish. When fairly close to shore (e.g., <5 nm) operators may spend upwards of two hours of idle time a day traveling back and forth to the offshore aquafarm. As commercial aquafarms grow the distance from shore and the size of the cages will increase dramatically increasing inefficiencies in this conventional model and reducing the profitability of the farm.

SUMMARY

One embodiment is directed to a system that includes at least one offshore aquafarm comprising husbandry equipment and at least one aquaculture cage, computing and networking equipment, cloud services, and at least one uplink configured to provide connectivity between the computing and networking equipment and the cloud services. The cloud services are configured to be accessed by a remote operator to monitor and control the at least one offshore aquafarm.

Another embodiment is directed to a method, which may include connecting at least one offshore aquafarm to cloud services via at least one uplink, wherein the at least one offshore aquafarm comprises husbandry equipment and computing and networking equipment. The method may also include monitoring and controlling, by a remote operator, the at least one offshore aquafarm by accessing the cloud services.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of certain embodiments of a cloud-based autonomous aquaculture system, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different configurations and functions discussed below may be performed in a different order and/or concurrently with each other. Furthermore, if desired, one or more of the described configurations or functions may be optional or may be combined. As such, the following description should be considered as merely illustrative of the principles, teachings and embodiments of this invention, and not in limitation thereof.

Most conventional husbandry functions involve a wide array of analog pumps and motors in various configurations. These devices need to be turned on and off in a specific way to accomplish the day's tasks without damaging the equipment or the fish. Operators are required to be physically next to the equipment, constantly monitoring the system for signs of fault or defects. Other husbandry functions include monitoring the water quality in and around the aquafarm by taking samples from multiple locations, a time consuming operation.

The inability to reliably communicate with aquaculture systems and automate labor intensive tasks is a significant barrier to scalable aquaculture systems.

Figure 1:
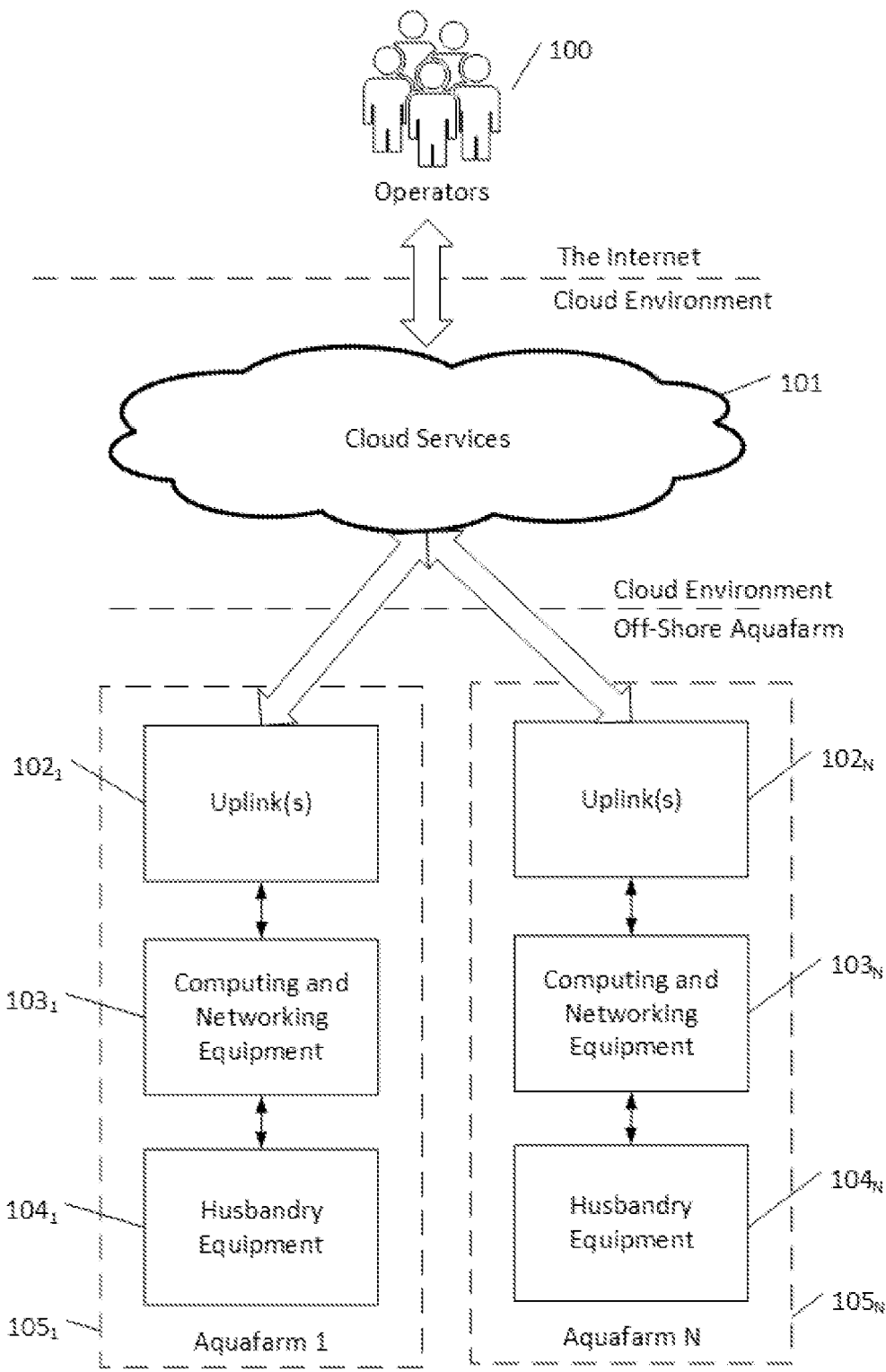
FIG. 1 illustrates a high-level system architecture where multiple aquafarms are accessible to operators through cloud services, according to an embodiment.

As illustrated in the example of FIG. 1, operators 100 are able to communicate and interact with the offshore aquafarm 105 and associated husbandry equipment 104 through managed cloud services 101. Husbandry functions provided include, but are not limited to, feeding fish, harvesting fish, cleaning the aquaculture cage and removing mortalities from the aquaculture cage. Cloud services 101 may aggregate aquafarms 105 into a single cloud environment allowing operators 100 to monitor and control one or more aquafarms 105 simultaneously.

According to certain embodiments of the invention, one or more uplinks 102 provide network computing and networking equipment 103 connectivity to cloud services 101. Networking and computing equipment may include firewalls, embedded computers, switches, Internet Protocol (IP) enabled cameras and other network enabled devices which facilitate the secure, reliable monitoring, and command and control (C2) of husbandry equipment 104 installed on the offshore aquafarm 105. On-board computing and networking equipment 103 may communicate directly with husbandry equipment 104 through standardized protocols, such as Transmission Control Protocol (TCP), or indirectly through an electro-mechanical device which supports a protocol like TCP.

Figure 2:
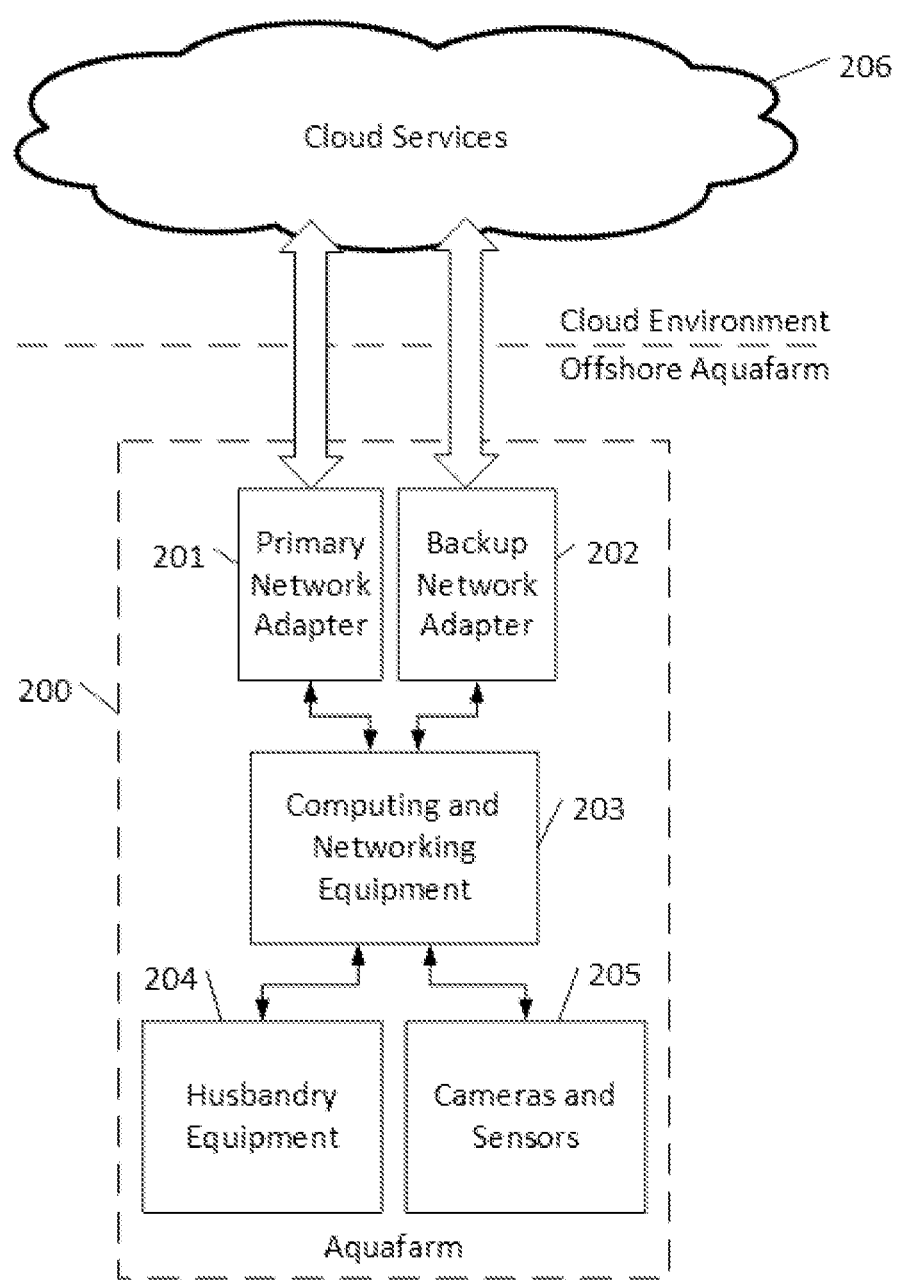
FIG. 2 illustrates one embodiment of an aquafarm utilizing multiple network adapters to provide redundant network links.

FIG. 2 illustrates an embodiment which utilizes two adapters 201, 202 which serve as the uplinks 102 for the aquafarm. According to an embodiment, to guarantee network connectivity, a primary network adapter 201 is used in conjunction with a backup network adapter 202. In one embodiment, the network adapters are configured to provide high-availability (HA) wherein if the primary network adapter 201 fails it will result in network traffic being routed through the backup network adapter 202. In another embodiment, the network adapters are configured in parallel allowing network traffic to flow through either the primary network adapter 201 or the backup network adapter 202. The computing and networking equipment may detect congestion through the primary network adapter 201 and choose to route traffic through the secondary network adapter 202, thus aggregating the bandwidth available for network communications. The network adapters may leverage high-bandwidth communication technologies such as Wi-Fi as well as lower bandwidth technologies such as cellular networks or DSL.

Figure 3:
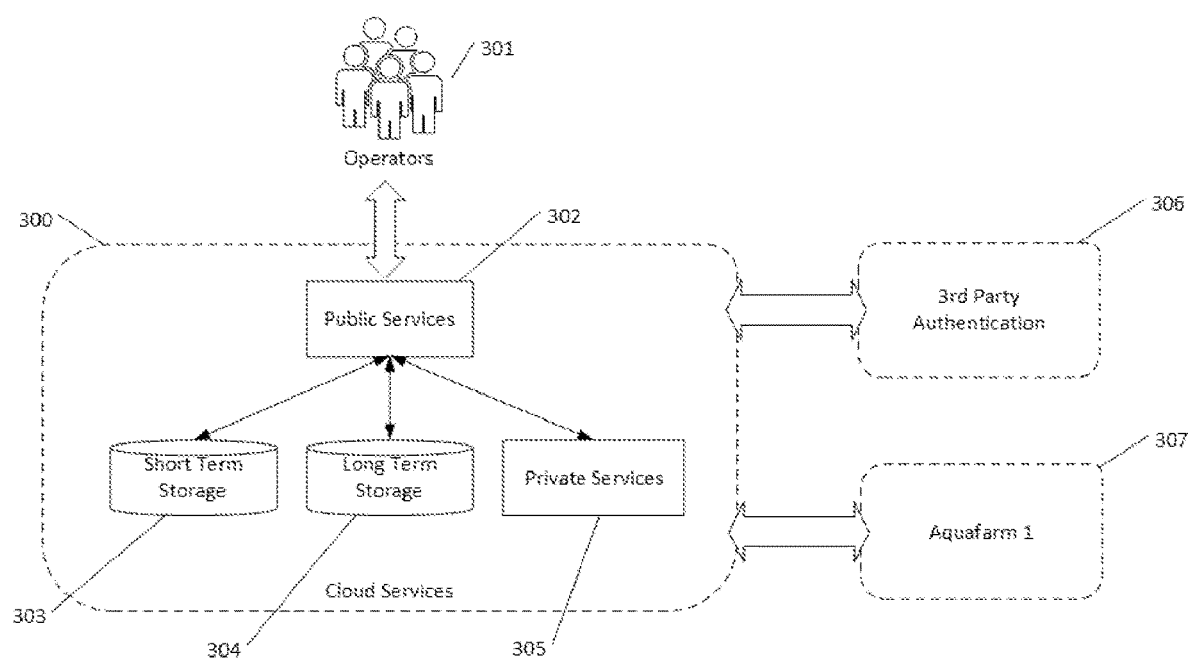
FIG. 3 illustrates a high-level data cloud services architecture, according to an embodiment.

FIG. 3 illustrates a high level architecture embodiment of the cloud services 300 and the external actors it may interact with. Cloud services 300 may leverage an Infrastructure as a Service (IaaS) provider or Platform as a Service (PaaS) provider to manage computing resources such as processing power and network bandwidth. In another embodiment, the cloud services 300 are self-hosted in a managed data center. Public services 302 may host a web application which can be accessed securely by operators 301 through a variety of means. Additionally, public services 302 may expose an Application Programming Interface (API) to operators 302 providing data and C2 resources in industry standard formats such as JavaScript Object Notation (JSON) or Extensible Markup Language (XML).

Gaining access to the cloud services may be accomplished by checking operator 301 provided credentials against expected values stored in a short term storage database 303. In another embodiment, a 3rd party authentication mechanism 306 such as an external Active Directory, OAuth or OpenID may be used to authenticate user and ensure security.

Through network segmentation, virtual private network (VPN) or otherwise, private services 305 can be secured to only allow access from the aquafarm 307. Similarly, the aquafarm 307 may be configured through a firewall, network configuration or otherwise, to limit connectivity to allowed private services 305 and nothing more. In one embodiment, private services may 305 reach out to the aquafarm 307 to initiate and maintain a network link providing a route from an aquafarm 307 to other cloud services 300. In yet another embodiment, the aquafarm 307 may initialize and maintain a secure connection to various services hosted in the cloud 300.

Data storage requirements may be satisfied through two mechanisms. Short term storage 303 may provide, among other things, instantaneous access to the most recent volatile data which has been received by the system. An example of short term storage 303 may be an in-memory cache. Long term storage 304 may provide slower access to non-volatile memory allowing data to be persisted to disk and saved for later use. Storage services may be provided by conventional database packages, such as MS SQL or MongoDB, and stored directly onto the hard drive. Other embodiments may include the use cloud based object storage provided by an IaaS such as Amazon Web Services.

Depending on the embodiment of this disclosure, the cloud services 300 may exist on one or many computing devices. In one embodiment, each service may exist on its own computing devices with its own dedicated resources. According to another embodiment, all of the components which make up the cloud services 300 may exist on a single computing device where resources (hard drive, memory, etc.) are shared among the services.

Figure 4:
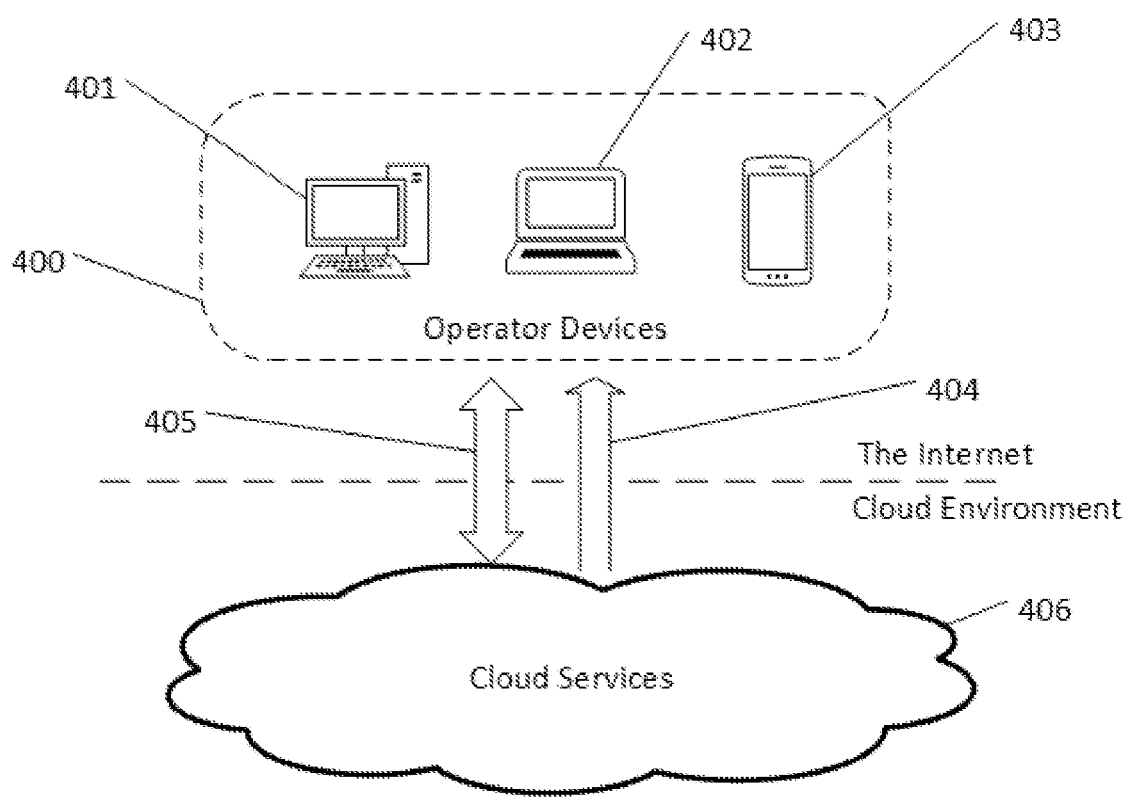
FIG. 4 illustrates the multiple ways a user can connect to, monitor and control an aquafarm, according to an embodiment.

FIG. 4 illustrates examples of the many ways an operator 400 may access cloud services 406 provided by this disclosure. In one embodiment, an operator 400 may access cloud services 406 and thereby one or many aquafarms, through a web browser installed on a desktop computer 401. Additional embodiments include access to cloud services 406 through a web browser installed on a laptop computer 402 or a smartphone 403.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A system, comprising:
    more than one offshore aquafarm in open ocean, the more than one offshore aquafarm each comprising husbandry equipment and an aquaculture cage;
    computing and networking equipment provided at each offshore aquafarm and configured to communicate with and control the respective husbandry equipment;
    cloud services; and
    at least one uplink configured to provide connectivity between the computing and networking equipment and the cloud services,
    wherein the cloud services are configured to use at least one of an infrastructure as a service provider or platform as a service provider to manage computing resources,
    wherein the cloud services are configured to be accessed by a remote operator to monitor and control the more than one offshore aquafarm,
    wherein the cloud services are configured to aggregate the more than one offshore aquafarm into a single cloud environment to allow the operator to monitor and control the more than one offshore aquafarm simultaneously,
    wherein monitoring and controlling of the more than one offshore aquafarm comprises the operator controlling the husbandry equipment of one offshore aquafarm of the more than one offshore aquafarm to execute a first husbandry function, and
    wherein the first husbandry function comprises at least one of harvesting fish from the at least one aquaculture cage, cleaning the at least one aquaculture cage, or removing mortalities from the at least one aquaculture cage.

2. The system according to claim 1, wherein monitoring and controlling the more than one offshore aquafarm comprises monitoring and controlling the husbandry equipment of the one offshore aquafarm to also execute a second husbandry function comprising feeding fish.

3. The system according to claim 1, wherein the computing and networking equipment comprises embedded computers, switches, and Internet Protocol (IP) enabled cameras that facilitate secure monitoring and command and control (C2) of the husbandry equipment installed on the one offshore aquafarm.

4. The system according to claim 1, wherein the at least one uplink comprises at least two network adapters.

5. The system according to claim 1, wherein operator provided credentials are checked against expected values stored in a short term storage database before the remote operator is allowed access to the cloud services.

6. The system according to claim 1, wherein the remote operator accesses the cloud services through a web application.

* * * * *